Jan. 10, 1967 S. BRESKEND 3,297,889
CLOCK DRIVER
Filed Jan. 15, 1964
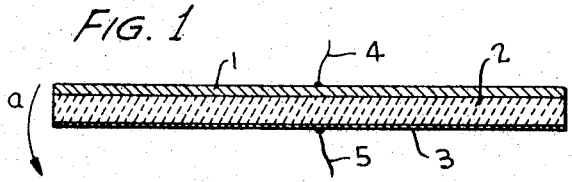
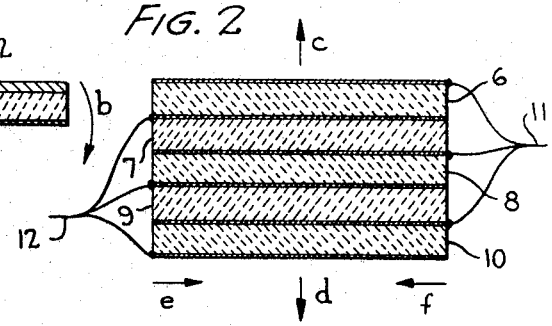
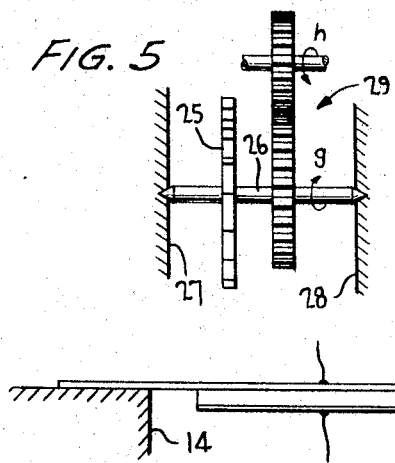
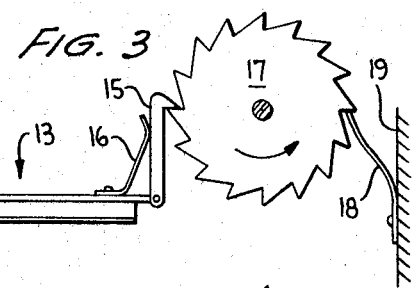
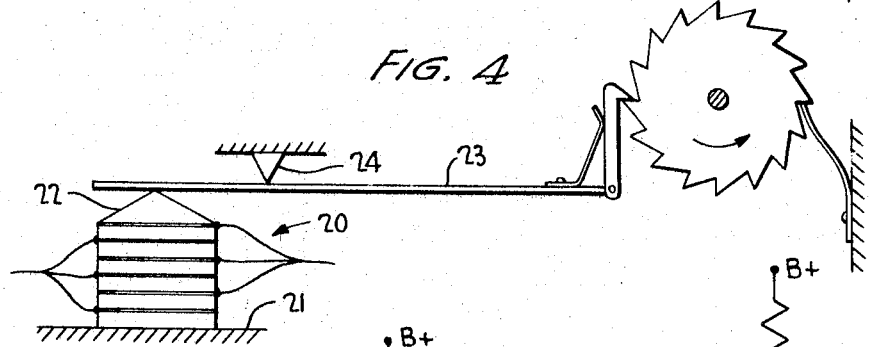
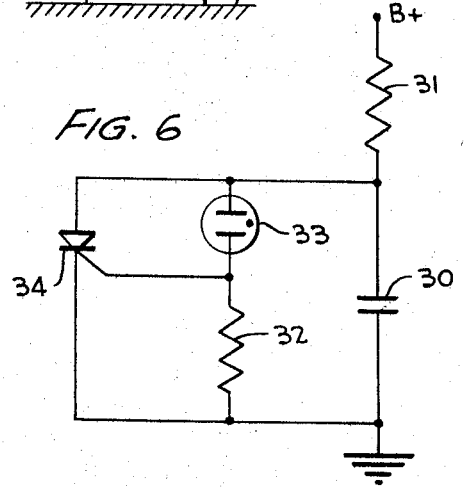
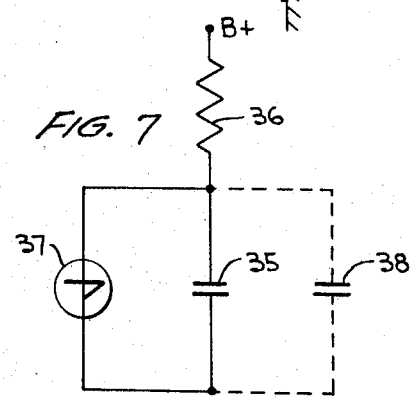
INVENTOR
SAM BRESKEND
BY: Harry M. Saragovitz,
Edward J. Kelly,
Herbert Berl,
L. P. Edgerton United States Patent Office 3,297,889
Patented Jan. 10, 1967

3,297,889
CLOCK DRIVER
Sam Breskend, Washington, D.C., assignor to the United States of America as represented by the Secretary of the Army
Filed Jan. 15, 1964, Ser. No. 337,961
10 Claims. (Cl. 310—8.1)

The invention described herein may be manufactured and used by or for the Government of the United States of America for governmental purposes without the payment to me of any royalty thereon.

This invention relates generally to electric charge to motion transducers, and more particularly to an electromechanical clock mechanism which employs an electrostrictive element for developing electrical timing energy and converting the electrical energy into mechanical energy. Prior art electro-mechanical clock mechanisms such as the pendulum or reciprocating motor mechanism and the vibrating tuning fork mechanism require complex electronic oscillator or feedback driving circuits which cause a substantial current drain on the battery power supply thereby limiting the life of the battery. Additionally, the prior art mechanisms employ magnetic circuits to accomplish the conversion of electrical energy to mechanical energy. These mechanisms are, therefore, subject to the influence of magnetic fields.

It is an object of this invention to provide apparatus for converting electrical energy to mechanical energy.

It is another object of the invention to provide an electro-mechanical oscillator.

It is still another object of the present invention to provide a simple electro-mechanical clock mechanism employing an electrostrictive element.

It is yet another object of the instant invention to provide a low current electro-mechanical clock mechanism thereby increasing battery life.

It is further object of the invention to provide an electro-mechanical clock mechanism which is not subject to the influence of magnetic fields.

It is yet a further object of the present invention to provide a simple electro-mechanical clock mechanism which uses no active electronic elements.

According to the present invention, the foregoing and other objects are attained by using the capacitive property of an electrostrictive element in combination with a resistance to establish an RC time constant and a voltage sensitive device to cause the discharge of the capacitance and thereby establish a charging time period. The electrostrictive element bends or expands when a voltage potential is applied across it. Thus, there is a bending or expanding motion during each charging time period or cycle. This motion is then converted to rotational motion by any suitable means such as, for example, a pawl and ratchet wheel.

This specific nature of the invention, as well as other objects, aspects, uses and advantages thereof, will clearly appear from the following description and from the accompanying drawings, in which:

FIG. 1 is a cross-sectional view of an electrostrictive element used in one embodiment of the invention;

FIG. 2 is a cross-sectional view of an electrostrictive element used in another embodiment of the invention;

FIG. 3 is a side view of the embodiment of the invention which employs the electrostrictive element of FIGURE 1;

FIG. 4 is a side view of the embodiment of the invention which employs the electrostrictive element of FIGURE 2;

FIG. 5 is an end view showing the ratchet wheel and gear train employed in both the embodiments of FIGURES 3 and 4;

FIG. 6 is a schematic diagram of a charging and discharging circuit which may be used with either of the embodiments of FIGURES 3 and 4; and FIG. 7 is a schematic diagram of another charging and discharging circuit which is thermally compensated and which may also be used with either of the embodiments of FIGURES 3 and 4.

Referring now to the drawings, and more particularly, to FIGURE 1 wherein there is shown a thin flexible strip of metal 1 which is bonded to a thin electrostrictive ceramic strip 2. Surface 3 of the ceramic strip 2 is provided with a conductive metal coating. Electrically attached to the metal strip 1 and the conductive coating are wires 4 and 5, respectively. When a voltage is applied across the wires 4 and 5 and therefore across the ceramic strip 2, the ceramic strip tends to expand in a direction parallel to the applied electric field and to contract in a direction perpendicular to the applied electric field. Since the ceramic strip 2 is bonded to the metal strip 1, the bonded surface is not free to contract. Surface 3 is, however, free to contract. This results in a bending of the combined metal and ceramic structure in the directions indicated by arrows $a$ and $b$.

While the expansion of the electrostrictive element in the direction parallel with the applied field is small, useful displacement using the expansion property of the element can be obtained by stacking a large number of elements together as shown in FIGURE 2. Ceramic strips 6, 7, 8, 9, and 10 are arranged in a vertical stack. The top surface of ceramic strip 6, the adjacent surfaces of ceramic strips 6 and 7, 7 and 8, 8 and 9, and 9 and 10, and the bottom surface of ceramic strip 10 are provided with conductive metallic coatings. Wire 11 is electrically connected to the coating on top surface of ceramic strip 6, and to the coatings of the adjacent surfaces of ceramic strips 7 and 8 and 9 and 10. Wire 12 is electrically connected to the coatings of the adjacent surfaces of ceramic strips 6 and 7 and 8 and 9 and to the coating on the bottom surface of ceramic strip 10. When a voltage is applied across wires 11 and 12 and therefore across each of ceramic strips 6, 7, 8, 9 and 10, the stacked structure expands in the directions indicated by arrows $c$ and $d$ and contracts in the directions indicated by arrows $e$ and $f$. The expansion of the stacked structure is several times greater than the expansion of the single ceramic element.

Referring now to FIGURE 3 therein there is shown an electrostrictive element 13, of the type shown in FIGURE 1, attached at one end to a support 14. The other end of the electrostrictive element 13 is connected to a pawl 15 which is positioned by a biasing spring 16. The pawl 15 engages ratchet wheel 17. The ratchet wheel 17 is prevented from rotating in a clockwise direction by ratchet spring 18 which is attached to support 19. When a voltage is applied across the input wires of electrostrictive element 13, the element bends in a clockwise direction. Pawl 15 is therefore pulled in a downward direction causing ratchet wheel 17 to rotate in a counter-clockwise direction.

FIGURE 4 shows a mechanism which uses the same ratchet wheel assembly of the mechanism shown in FIGURE 3 but which uses the type of electrostrictive element shown in FIGURE 2. Electrostrictive element 20 is attached at one end to a support 21. The other end of the element 20 is provided with a conical or pyramidal shaped cap 22. Cap 22 engages one end of a lever arm 23 which moves against a fulcrum 24. The other end of the lever arm 23 is connected to the ratchet and pawl mechanism in a manner similar to that shown in FIGURE 3. When a voltage is applied across the input wires of electrostrictive element 20, the element expands in an upward direction causing the lever arm 23 to operate the ratchet and pawl mechanism. The purpose of the lever system is to further amplify the motion of the electrostrictive element. The fulcrum 24 is therefore placed at a position to the left of the midpoint of the lever arm 23.

To utilize the rotational motion imparted to the ratchet wheels of the mechanisms shown in FIGURES 3 and 4 it is usual to couple the ratchet wheel to a gear train. FIGURE 5 shows an end view of a ratchet wheel 25 which is carried on a shaft 26. Shaft 26 is mounted on bearing supports 27 and 28. Gear train 29 is shown coupled to the ratchet 25 by way of shaft 26. Rotation is indicated by the arrows $g$ and $h$.

The voltages applied across the electrostrictive elements of the mechanisms shown in either of FIGURES 3 or 4 may be supplied by the circuit shown in FIGURE 6. Capacitor 30 is the electrostrictive element and is charged by the current flowing through resistor 31 from a source of voltage B+. Resistor 32 establishes the desired firing potential of gas discharge tube 33. When the voltage across the electrostrictive element 30 reaches the firing potential of tube 33, the tube conducts thereby connecting the gate electrode of silicon-controlled rectifier 34 to a potential which is equal to the anode potential less the voltage drop of tube 33. The silicon-controlled rectifier 34 conducts under these conditions and discharges the electrostrictive element 30 to ground. Once the element 30 has discharged to the ground the cycle repeats.

FIGURE 7 shows an improved charging and discharging circuit wherein the electrostrictive element 35 is charged by a source of voltage B+ through a resistor 36 as before but is discharged by a Shockley diode 37. The Shockley diode 37 conducts when the voltage across the electrostrictive element 35 reaches the avalanche voltage of the N-P junction. In addition to being simpler than the circuit of FIGURE 6, the advantage of this circuit is that the electrostrictive element 35 is discharged to very close to zero volts potential thus making more efficient use of the power supply B+ and obtaining greater motion from electrostrictive element 35.

The capacitance of the electrostrictive elements varies with temperature. The charging RC time constant and the cycle time period are therefore temperature dependent. Compensation may be provided by employing a charging resistance having a complementary thermal characteristic. Compensation may also be provided by shunting the electrostrictive element with a much larger thermally stable capacitance as shown by capacitance 38 in FIGURE 7. Since the capacitance of capacitance 38 is much larger than that of the electrostrictive element 35, the RC time constant remains substantially constant with temperature change.

Both the circuits of FIGURES 6 and 7 require very small currents supplied from battery power supplies. This is because the current is only used to charge the small capacitance of the electrostrictive elements.

It should be noted the motion of the electrostrictive element may be used in other and different ways and by other and different motion transformation mechanisms than those shown in the embodiments of FIGURES 3 and 4. For example, an electrostrictive element of the type shown in FIGURE 2 may be used to operate a mechanical switch, or an electrostrictive element of the type shown in FIGURE 1 may be used in a waveguide to switch R.F. energy between one of two sections of the waveguide.

It will be apparent that the embodiments shown are only exemplary and that various modifications can be made in construction and arrangement within the scope of the invention as defined in the appended claims.

I claim as my invention:

1. An electric charge to motion transducer timing mechanism comprising electrostrictive means for producing motion in response to an electric field generated across one of the dimensions of said electrostrictive means by an accumulated charge, a source of voltage, resistance means connecting said electrostrictive means to said source of voltage, means connected across said electrostrictive means for discharging said electrostrictive means when the voltage across said electrostrictive means reaches a predetermined value, and a thermally stable capacitance having a capacitance value much larger than the capacitive value of said electrostrictive means and connected across said electrostrictive means; whereby the RC time constant of the series circuit comprising said resistance and said electrostrictive means remains substantially constant with temperature change.

2. A motion transducer as defined in claim 1 wherein said means for discharging said electrostrictive means is a Shockley diode.

3. A motion transducer as defined in claim 1 wherein said means for discharging said electrostrictive means comprises a gas discharge tube, a resistance, said gas discharge tube and said resistance being connected in series and across said electrostrictive means, and a silicon-controlled rectifier connected across said electrostrictive means and gated to conduction by the conduction of said gas discharge tube.

4. An electro-mechanical clock mechanism comprising electrostrictive means, a ratchet and pawl mechanism, means operably connecting said electrostrictive means to said ratchet and pawl mechanism, and means for causing said electrostrictive means to move.

5. An electro-mechanical clock mechanism as defined in claim 4 wherein said electrostrictive means comprises a thin strip of metal, a strip of ceramic material bonded at one surface to said thin strip of metal, and a metallic conductive coating on another surface of said strip of ceramic material.

6. An electro-mechanical clock mechanism as defined in claim 4 wherein said electrostrictive means comprises a plurality of layers of ceramic material, each of said layers of ceramic material being coated on adjacent surfaces by a metallic conductive coating.

7. An electro-mechanical clock mechanism as defined in claim 4 wherein said means for causing said electrostrictive means to move comprises a source of voltage, resistance means connecting said electrostrictive means to said source of voltage, and means connected across said electrostrictive means for discharging said electrostrictive means when the voltage across said electrostrictive means reaches a certain value.

8. An electro-mechanical clock mechanism as defined in claim 7 wherein said means for discharging said electrostrictive means is a Shockley diode.

9. An electro-mechanical clock mechanism as defined in claim 7 wherein said means for discharging said electrostrictive means comprises a gas discharge tube, a resistance, said gas discharge tube and said resistance being connected in series and across said electrostrictive means, and a silicon-controlled rectifier connected across said electrostrictive means and gated to conduction by the conduction of said gas discharge tube.

10. An electro-mechanical clock mechanism as defined in claim 7 further including a thermally stable capacitance connected across said electrostrictive means and having a capacitance larger than the capacitance of said electrostrictive means, whereby the RC time constant of the series circuit of the resistance connecting said electrostrictive means to said source of voltage and said electrostrictive means remains substantially constant with temperature change.

References Cited by the Examiner
UNITED STATES PATENTS

| | | | |
|---|---|---|---|
| 3,060,333 | 10/1962 | Bradley | 310—8.6 X |
| 3,110,824 | 11/1963 | Flanagan | 310—8.5 |
| 3,176,167 | 3/1965 | Vosseler | 310—8.1 |
| 3,192,417 | 6/1965 | Seck et al. | 310—8.6 |
| 3,201,597 | 8/1965 | Balan | 307—88.5 |
| 3,204,133 | 8/1965 | Tschudin | 310—8.6 X |

MILTON O. HIRSHFIELD, *Primary Examiner.*

A. J. ROSSI, J. D. MILLER, *Assistant Examiners.*